United States Patent [19]
De Jong

[11] Patent Number: 5,462,792
[45] Date of Patent: Oct. 31, 1995

[54] COATING SHEET MATERIAL

[75] Inventor: Hendrikus De Jong, Maasdam, Netherlands

[73] Assignee: Hunter Douglas International N.V., Curacao, Netherlands Antilles

[21] Appl. No.: 85,897

[22] Filed: Jun. 30, 1993

[30] Foreign Application Priority Data

Jul. 1, 1992 [GB] United Kingdom .................... 9214019

[51] Int. Cl.⁶ .................................................. B32B 5/06
[52] U.S. Cl. .................. 428/297; 427/256; 427/287; 427/428; 428/285; 428/409
[58] Field of Search ...................................... 427/256, 287, 427/288, 428; 428/260, 263, 465, 245, 285, 409, 297

[56] References Cited

U.S. PATENT DOCUMENTS

| | | | |
|---|---|---|---|
| 4,463,039 | 7/1984 | O'Connell et al. | 427/421 |
| 4,612,224 | 9/1986 | Davis | 428/109 |
| 4,734,236 | 3/1988 | Davis | 264/112 |
| 4,865,788 | 9/1989 | Davis | 264/112 |
| 4,929,475 | 5/1990 | de Jong | 427/407.1 |
| 4,957,809 | 9/1990 | Davis | 428/283 |
| 5,154,968 | 10/1992 | De Petris et al. | 428/283 |

FOREIGN PATENT DOCUMENTS

| | | |
|---|---|---|
| 0005536 | 11/1979 | European Pat. Off. . |
| 0248443 | 12/1987 | European Pat. Off. . |
| 246508A1 | 6/1987 | Germany . |

*Primary Examiner*—James J. Bell
*Attorney, Agent, or Firm*—Gary M. Polumbus; Holland & Hart

[57] ABSTRACT

A sheet material having a textured surface coating thereon. The sheet material is formed by a substrate having on at least one face a cured, heat-dried or heat-cured lacquer layer formed by a lacquer having fibers incorporated therein. The fibers extend into the surface to form a textured surface.

14 Claims, 8 Drawing Sheets

COATING SHEET MATERIAL

This invention relates to a sheet material having a textured surface.

Coated sheet materials are conventionally made in a roller-type apparatus in which a sheet substrate, which may be in the form of a strip, is coated on at least one face by passage between two rollers one or both of which serves to apply lacquer to the sheet. A process of this kind is used in so-called coil-coating in which the substrate, typically of thin metal, is coiled up both before and after the coating procedure. Sheet materials having a textured (for example, granular) surface cannot be prepared in such roller-type apparatus. This is because the distance between the rollers determines the thickness of the wet lacquer layer. If any granules or particles present in the wet lacquer layer have a diameter greater than the nip between the rollers, the particles will be squashed or crushed as they travel between the rollers. There are also limits to the maximum thickness of the wet lacquer layer in the usually high speed coil coating and subsequent stoving processes.

The present invention provides a sheet material with a textured surface which may be prepared in a roller-type apparatus, and a process for its manufacture.

The sheet material of the invention comprises a substrate and, on at least one face of said substrate, a heat-dried or heat-cured lacquer layer comprising fibres which affect the uniformity of the surface of the dried or cured lacquer layer, thereby obtaining a textured surface, said fibres optionally being dispersed within a film-forming binder.

The invention also provides a sheet material as defined above in which the said fibres have, during the heat-drying or heat-curing, altered their dimensions or otherwise affected the uniformity of the surface of the dried or cured lacquer layer.

The invention further provides a process for the manufacture of a sheet material with a textured surface, on at least one face of said material, which process comprises applying to at least one face of a substrate a lacquer layer comprising fibres which are capable of affecting the uniformity of the surface of the lacquer layer, said fibres optionally being dispersed within a film-forming binder; and heat-drying or heat-curing the lacquer layer thus formed.

The invention further provides a process as defined above, wherein said fibres alter their dimensions on heat-drying or heat-curing or are otherwise capable of affecting the uniformity of the surface of the lacquer on drying or curing. The lacquer layer is preferably applied to the substrate by a coil-coating process.

The fibres which may be used are, for example, acrylic, polyester or nylon fibres. The following commercially available fibres may for example be used. Acryl fibrous material FPAC 247/050, Polyester fibrous material FPES 1130060, and Dralon (acrylic) short-cut fibres 17 D tex/2 mm. Natural fibres may also be used, e.g. cellulosic fibres such as sisal, e.g. that sold under the designation Sisal fibrous material F 506/200.

The average length of the fibres is preferably from 0.01 to 6.0 mm, more preferably not more than 3.0 mm, and the average diameter is preferably from 1 to 60 µm, more preferably 30 to 40 µm.

The lacquer layer usually comprises the fibres dispersed within a film-forming binder, in which case the fibres are generally present in a proportion of from 10 to 40%, preferably from 14 to 32%, based on the weight of the dried or cured lacquer layer. A fibre content which is too low will produce a finish which looks like dirty paint; a fibre content above 40% can lead to low film integrity and can have an unfavourable effect on the texture. The minimum proportion of binder depends on the fibres used. For example it is possible to avoid using a binder when using sufficiently fine nylon fibres. If no binder is present the fibres may be dispersed in a dispersing medium, comprising for example, any substance mentioned below as a solvent, or water. Thus, the relative proportion of fibres in the lacquer layer depends upon the desired effect and can vary according to the size and type of the fibre used.

The film-forming binder may be of any type conventionally used in lacquers for coating the particular substrate chosen. Synthetic resins are generally preferred, especially polyester, polyacrylic or polyurethane resins. While the film-forming binder is usually dissolved in an appropriate solvent, it is within the scope of the invention to use a lacquer in which the binder is an emulsion, e.g. in water.

The lacquer may comprise, in addition to the fibres and the film-forming binder (when present, the usual pigments, fillers and other ingredients usually present in such lacquers. A matting agent (e.g. Syloid) may, for example, be present. Thus the fibre-containing lacquers for use in the invention are conveniently made by adding to a suitable commercially available lacquer the required amount of the chosen fibre material.

The lacquer comprising the fibres is wet when applied to the substrate and is subsequently heat-dried or cured. Any solvent may be used in the lacquer as long as the fibres themselves do not dissolve in the solvent. When no binder is present any appropriate liquid can be used to disperse the lacquer comprising the fibres, for example water. Mainly aromatic solvents are suitable for use with polyester and polyurethane fibres. In particular, a mixture of Solvesso 100 and Solvesso 150 with some butanol is suitable for use with polyester fibres and a mixture of Solvesso 100 and Solvesso 150 with about 25% diacetone alcohol is suitable for use with polyurethane fibres. In some cases, the solvent is absorbed by the fibres and the latter may swell without, however, dissolving.

The lacquer may be dried or cured, for example by stoving under the usual conditions for coil coating. For example the lacquer layer may be dried or cured in an oven kept at a temperature of e.g. about 325° C. for (say) 24 seconds. The peak temperature of the lacquer layer is then about 240° C.

The nature of the substrate has no effect on the texture of the coated sheet material. Thin metal sheets are typically used, for example of aluminum, steel or galvanized steel.

The sheet material of the invention may show various visual and textured effects depending on, for example, the choice of substrate (e.g. reflective, non-reflective or coloured), the film-forming binder (e.g. thickness of the lacquer layer formed, its degree of transparency, and its colour), fibres (e.g. their chemical constitution, size and colour), and the temperature and duration of the heat-treatment.

For example, when the lacquer is dried at high temperature the fibres may contract and lift the lacquer, thus forming an uneven granular surface with a suede-like look. Such an effect is obtainable with, for example, acrylic fibres.

If the lacquer solvent has been absorbed by the fibres, and continues to evaporate from the fibres after it has evaporated from the binder, bubbles may be formed in the surface of the lacquer by the later-evaporating solvent. Such an effect is obtainable using, for example, polyester fibres.

It is also possible to obtain a leather-look surface with a very low relief using fibres which are not very sensitive to high stoving temperatures, for example, acrylic fibres. The fibres curl slightly when the lacquer is nearly dry but they remain substantially in the plane of the substrate.

In some cases the fibre is partly decomposed into gaseous products under the stoving conditions. The gases form bubbles providing a foam-look surface. Such an effect is obtainable with, for example, Sisal fibres.

The invention is further described with reference to the accompanying drawings, in which.

Figure 1:
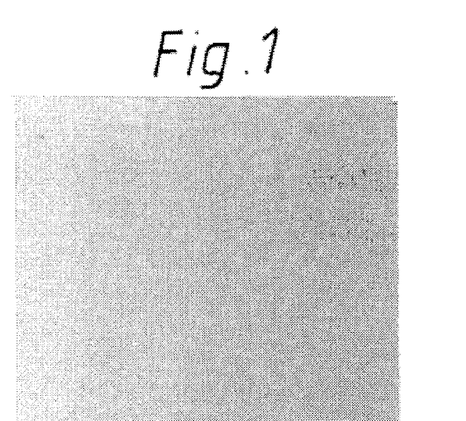
FIGS. 1–1H show various textures of sheet material in accordance with the invention wherein the fibers and the binders have the proportions set forth in Table 1 under Sample Nos. 1–1H.
Figure 1A:
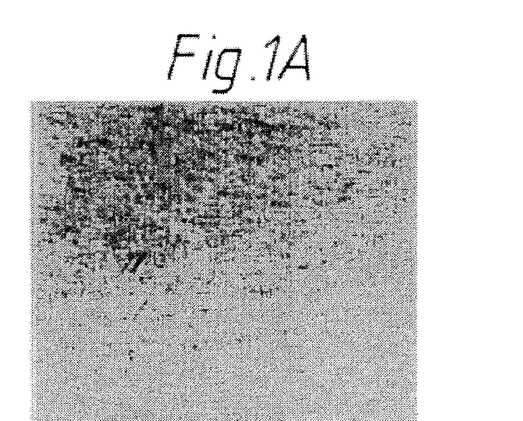
Figure 1B:
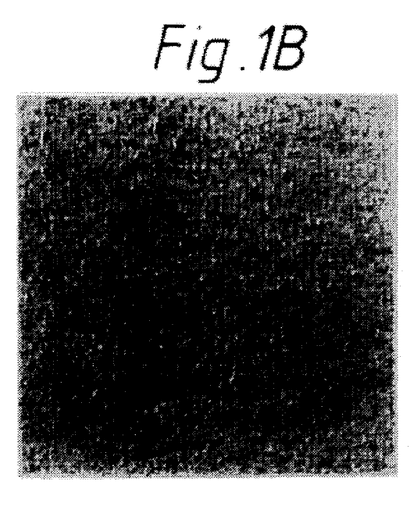
Figure 1C:
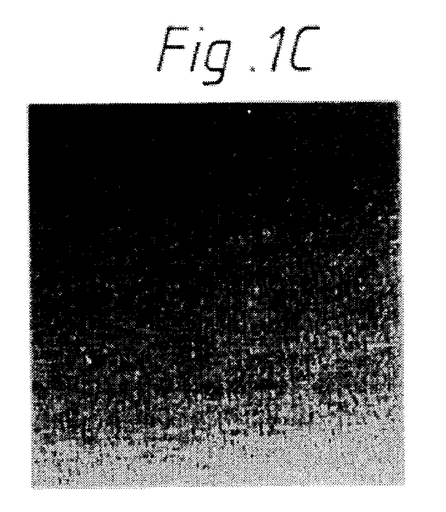
Figure 1D:
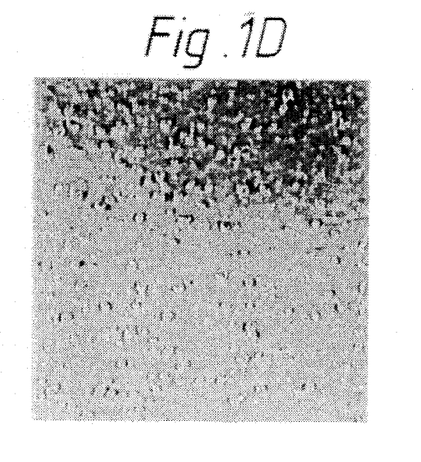
Figure 1E:
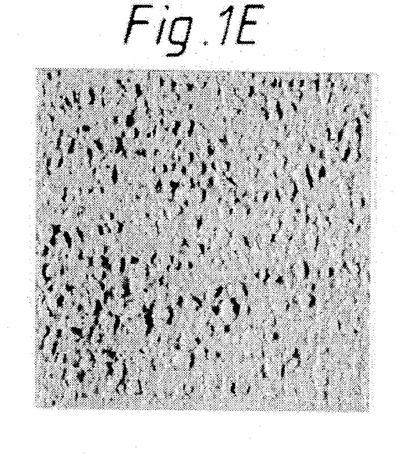
Figure 1F:
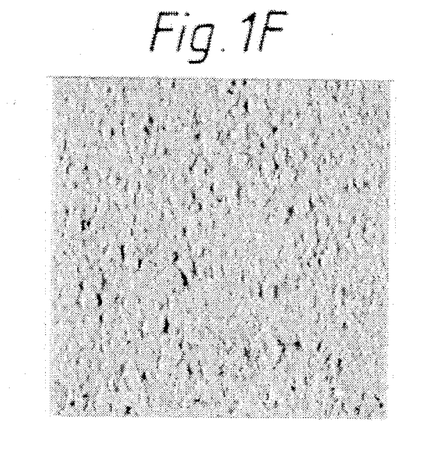
Figure 1G:
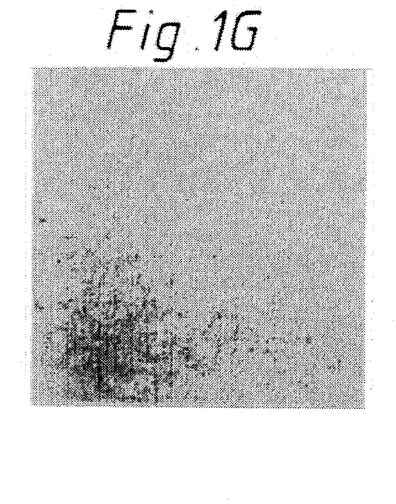
Figure 1H:
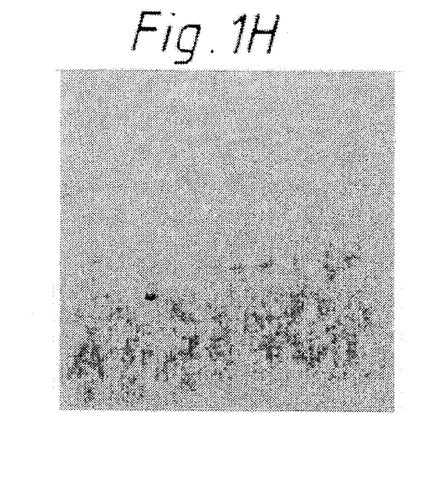
Figure 2:
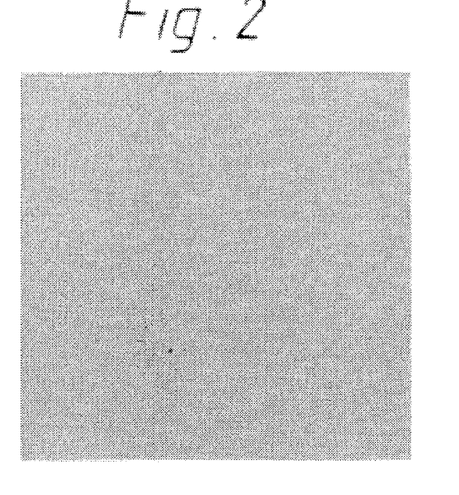
FIGS. 2–2G show different textures of sheet material in accordance with the present invention wherein the fibers and binders have the proportions set forth in Sample Nos. 2–2G of Table 1.
Figure 2A:
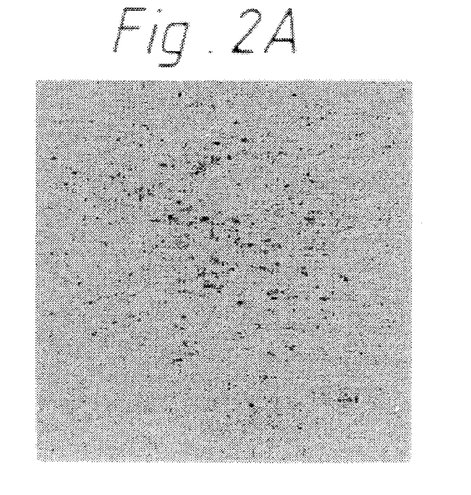
Figure 2B:
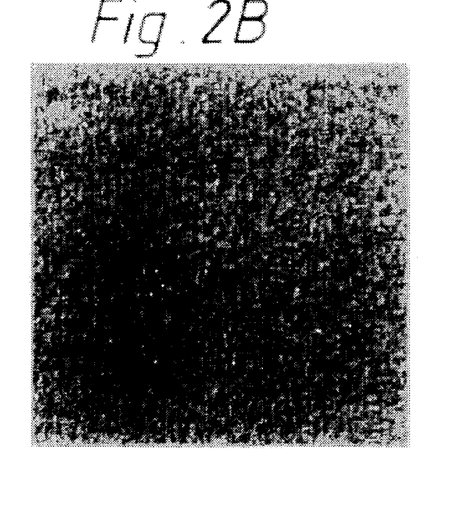
Figure 2C:
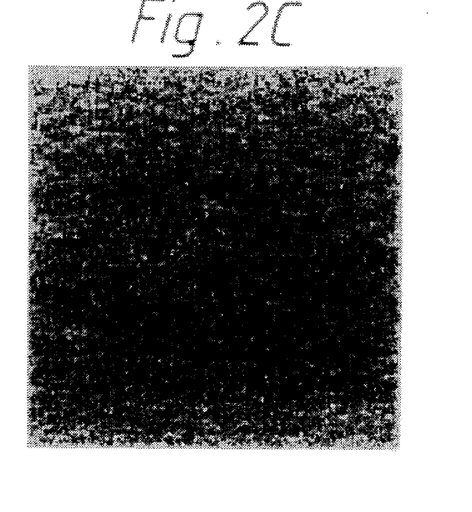
Figure 2D:
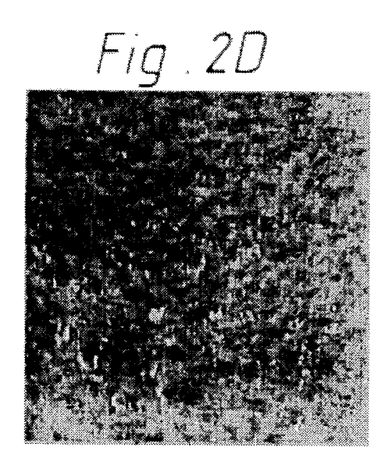
Figure 2E:
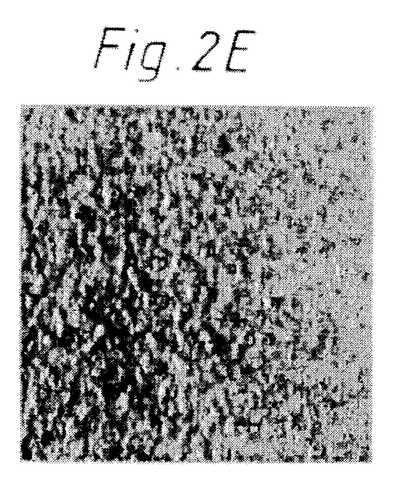
Figure 2F:
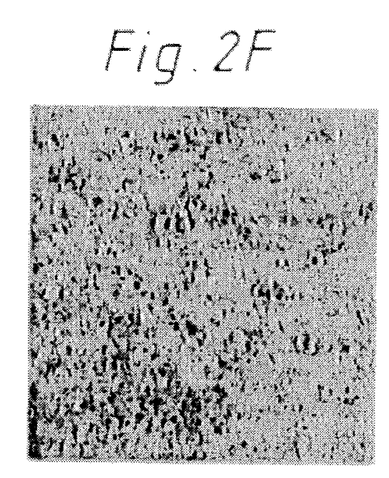
Figure 2G:
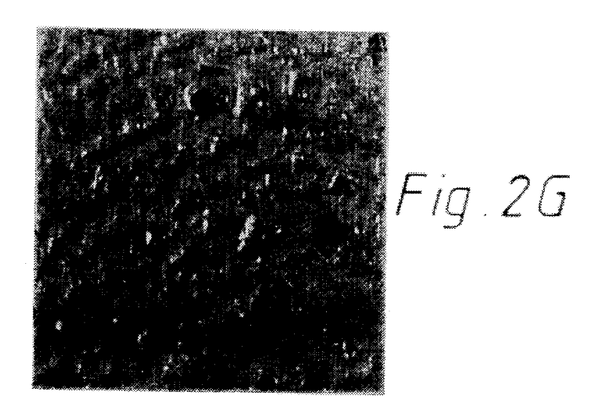
Figure 3:
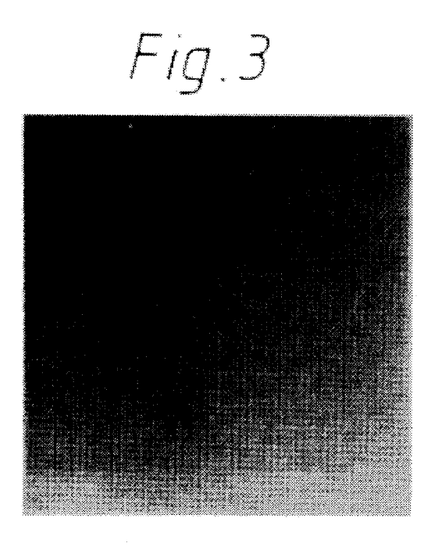
FIGS. 3–3B show different textures of sheet material in accordance with the present invention wherein the fibers and binders have the proportions set forth under Sample Nos. 3–3B of Table 1.
Figure 3A:
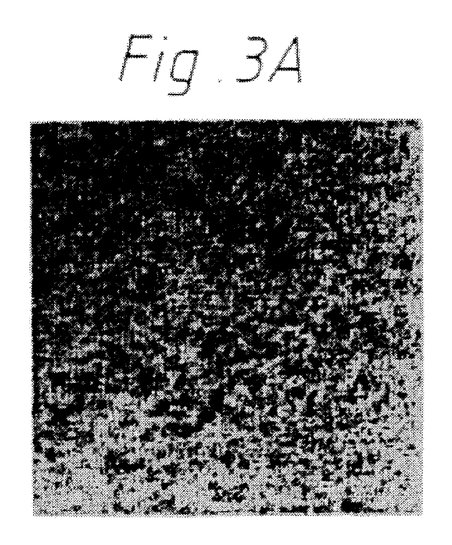
Figure 3B:
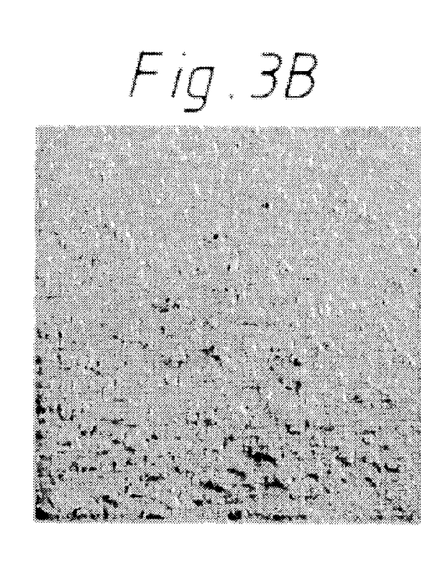
Figure 4:
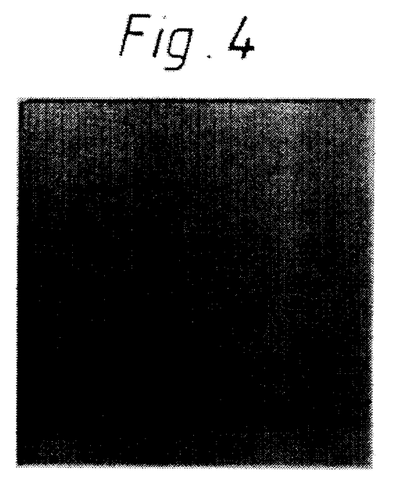
FIGS. 4–4F show different textures of sheet material in accordance with the present invention wherein the fibers and binders have the proportions set forth under Sample Nos. 4–4F of Table 1.
Figure 4A:
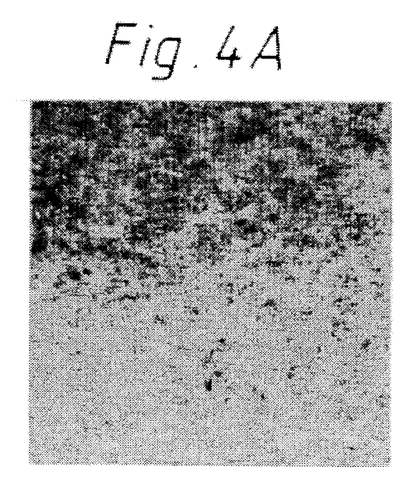
Figure 4B:
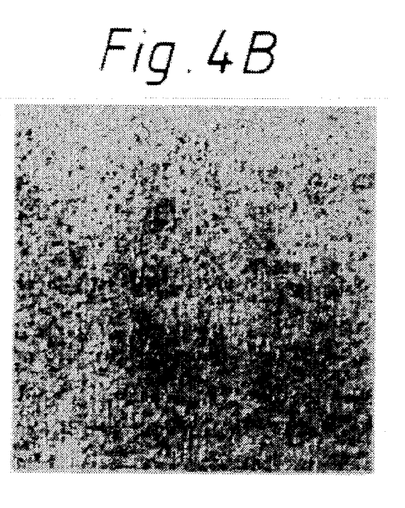
Figure 4C:
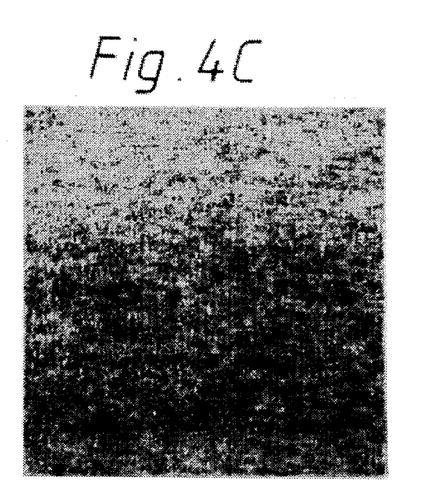
Figure 4D:
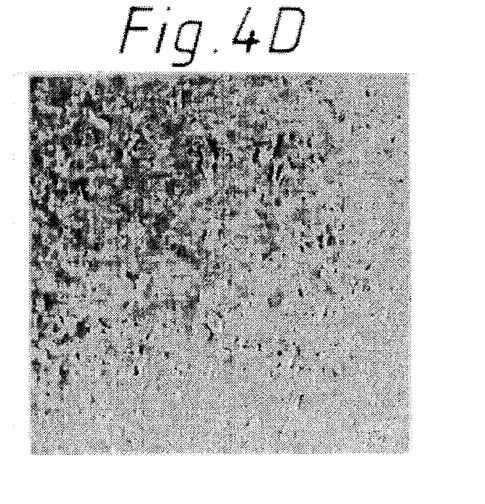
Figure 4E:
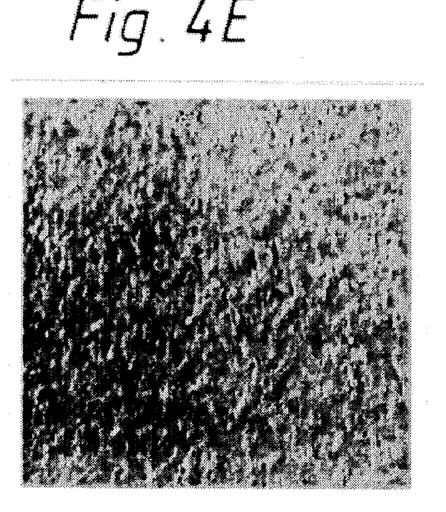
Figure 4F:
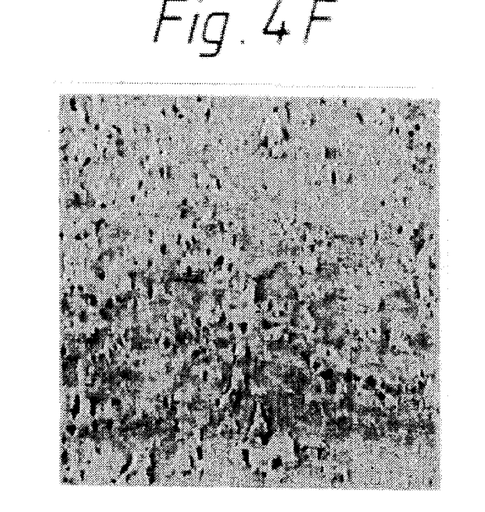
Figure 5:
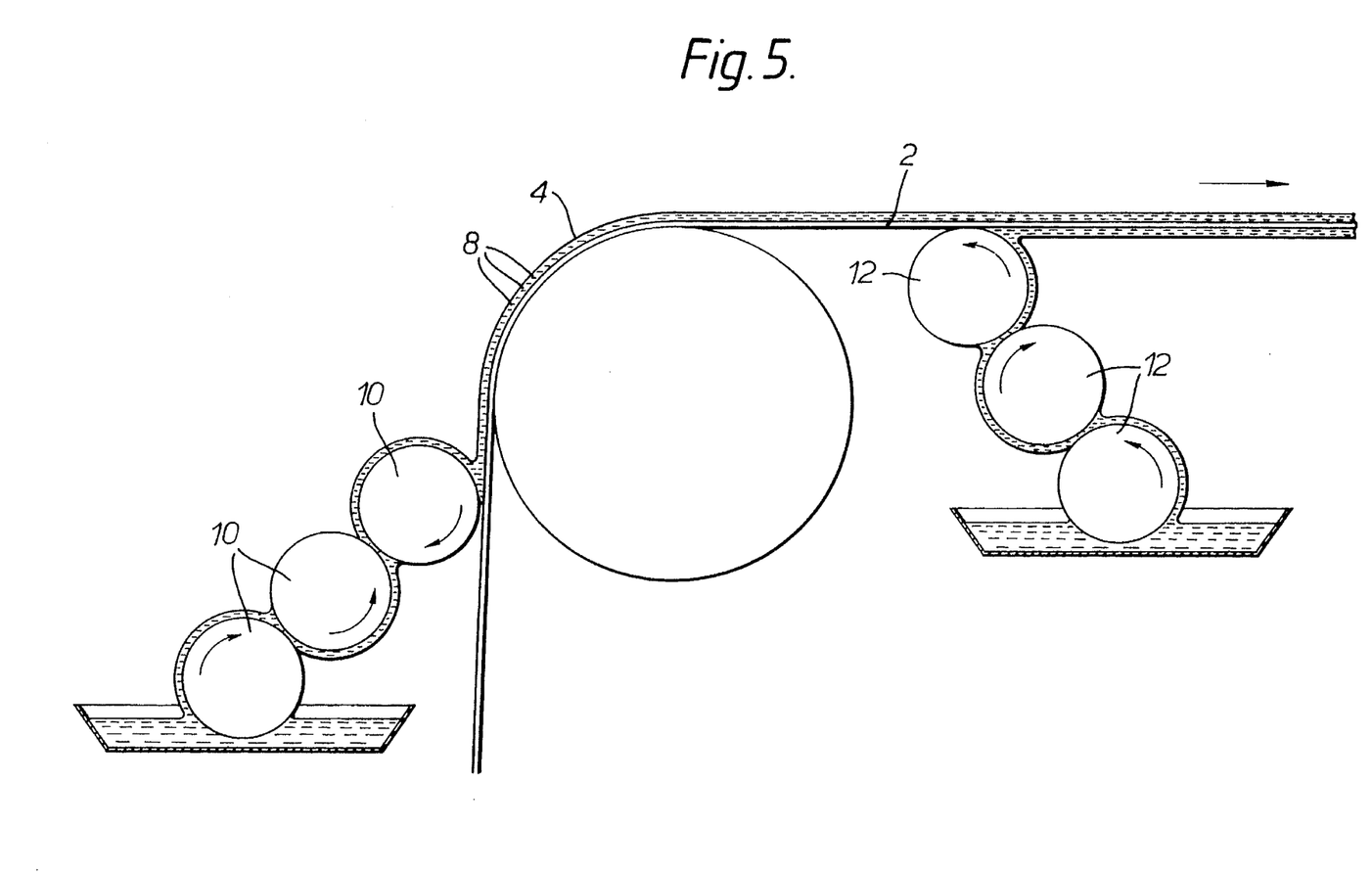
FIG. 5 is a diagrammatic representation of an apparatus in accordance with the present invention illustrating a substrate being coated in a conventional coil-coating process.

FIG. 5 shows a coating being applied to both sides of the substrate. The strip substrate (2) shown travels from left to right, typically at a speed of from 40 to 100 m/s. The film-forming binder (4) comprising fibres (8) is applied to the strip by rollers (10,12), which smooth out the lacquer to provide a layer on the substrate of substantially even thickness. The coatings are then cured by being heat-dried or heat-cured to securely bond onto the substrate, by means not shown.

The following Examples illustrate the invention. In particular, the Examples illustrate the way in which different textures can be achieved by varying the type of film-forming binder, fibres and proportion of fibres in the dried lacquer layer.

EXAMPLES

EXAMPLES 1 TO 4

The Examples were all prepared in a coil-coating process in which the lacquer was applied with a wire-bar. It is conventional to use a wire-bar to apply lacquers to a substrate in a coil-coating process in a laboratory. Similar results are to be expected in an industrial scale process when the lacquer is applied by rollers.

The solvents used were mainly aromatic: a mixture of Solvesso 100 and Solvesso 150 with some butanol was used for the polyester lacquers and a mixture of Solvesso 100 and Solvesso 150 with approximately 25% diacetone alcohol was used for the polyurethane lacquers. These solvents are conventionally used with the binders chosen.

The "special" gloss binders used in Examples 2 and 4 differed from the binders used in Examples 1 and 3 in that the "special" gloss binders additionally comprised a matting agent ("Syloid" silica).

The fibres used in the samples are listed below, together with their lengths and diameters:

| Fibre | Length (mm) | Diameter (μm) |
| --- | --- | --- |
| Acryl fibre FPAC 247/050 | 0.2–2 | 20–60 |
| Polyester fibre FPES 1130060 | 0.5–2 | 40–60 |
| Dralon 17D | 2 | approx 20 |
| Sisal F506/200 | 0.5–2 | approx 50 |

The samples were cured at an oven temperature of 325° C. for 24 seconds.

Table 1 below shows the types of fibres and film-forming binder used and the proportion of fibres in the dried lacquer (as a weight percentage of the dried lacquer layer) for each sample. The appearance and texture of the samples has been assessed. Photocopies of samples 1 to 4 themselves are shown in FIGS. 1 to 4 respectively.

TABLE 1

| SAMPLE NO | FIBRE USED | PROPORTION OF FIBRES (%) | BINDER | APPEARANCE TEXTURE |
| --- | --- | --- | --- | --- |
| 1 | none | 0 | glossy polyester | flat and smooth; white; |
| 1A | acryl fibre FPAC 247/050 | 14% | glossy polyester | discrete fine grains, most |
| 1B | acryl fibre FPAC 247/050 | 25% | glossy polyester | densely packed in 1C; near- |
| 1C | acryl fibre FPAC 247/050 | 30% | glossy polyester | suede look |
| 1D | polyester fibre FPES 1130060 | 14% | glossy polyester | surface rough, higher relief |
| 1E | polyester fibre FPES 1130060 | 25% | glossy polyester | than 1A–C (1F highest |
| 1F | polyester fibre FPES 1130060 | 30% | glossy polyester | relief), uneven surface due to different sized clusters of bubbles in lacquer surface; white |
| 1G | Dralon 17D tex/2 mm | 20% | glossy polyester | individual fibres clearly |
| 1H | Dralon 17D tex/2 mm | 20% | glossy polyester | visible as short "hairs" in lacquer; very low relief; white; near-leather look. |
| 2 | none | 0 | special gloss polyester | flat and smooth, off-white; |
| 2A | acryl fibre FPAC 247/050 | 14% | special gloss polyester | discrete fine grains — most |
| 2B | acryl fibre FPAC 247/050 | 25% | special gloss polyester | densely packed in 2C; cream- |
| 2C | acryl fibre FPAC 247/050 | 30% | special gloss polyester | brown; near-suede look. |
| 2D | polyester fibre FPES 1130060 | 21% | special gloss polyester | surface rough, bubbles more |
| 2E | polyester fibre FPES 1130060 | 26% | special gloss polyester | spread out than 1D–F; cream- |
| 2F | polyester fibre FPES 1130060 | 31% | special gloss polyester | brown |
| 2G | Sisal fibre F 506/200 | 15% | special gloss polyester | highest relief of all samples |

TABLE 1-continued

| SAMPLE NO | FIBRE USED | PROPORTION OF FIBRES (%) | BINDER | APPEARANCE TEXTURE |
|---|---|---|---|---|
| 3 | none | 0 | glossy polyurethane | 1 to 4; largest bubbles clearly visible; small patches of lacquer exist which are undisturbed; foam-look; cream-brown flat and smooth; mid-brown |
| 3A | acryl fibre FPAC 247/050 | 32% | glossy polyurethane | similar to 2A in appearance, but slightly higher relief; mid brown. |
| 3B | polyester fibre FPES 1130060 | 26% | glossy polyurethane | similar to 2D in appearance but clusters of bubbles more isolated in lacquer; mid brown |
| 4 | none | 0 | polyurethane special gloss | flat and smooth; grey-white |
| 4A | acryl fibre FPAC 247/050 | 16% | polyurethane special gloss | similar to 2A–C; grey-white |
| 4B | acryl fibre FPAC 247/050 | 26% | polyurethane special gloss | |
| 4C | acryl fibre FPAC 247/050 | 31% | polyurethane special gloss | |
| 4D | polyester fibre FPES 1130060 | 21% | polyurethane special gloss | some individual fibres visible — clusters of bubbles but none broken as in 1D–F and 2D–F; grey-white. |
| 4E | polyester fibre FPES 1130060 | 27% | polyurethane special gloss | |
| 4F | polyester fibre FPES 1130060 | 32% | polyurethane special gloss | |

I claim:

1. A sheet material comprising a substrate and a cured lacquer coating on at least one surface thereof, said coating including fibers dispersed therein and forming a textured surface on said substrate.

2. A sheet material as defined in claim 1 wherein said fibers are selected from the group consisting of acrylic fibers, polyester fibers, nylon fibers and cellulose fibers.

3. A sheet material as defined in claim 1 wherein said lacquer comprises a film forming binder selected from the group consisting of polyester resin, polyacrylic resin and polyurethane resin.

4. A sheet material as defined in claim 1 wherein said fibers in said cured lacquer coating are of heat-enlarged dimension.

5. A sheet material as defined in claim 1 wherein said fibers are selected from the group consisting of acrylic fibers, polyester fibers, nylon fibers and cellulose fibers, and wherein said lacquer is selected from the group consisting of polyester resin, polyacrylic resin and polyurethane resin.

6. A sheet material as defined in claim 2, 3 or 4 wherein the average length of the fibers before curing is from 0.01 mm. to 6.0 mm.

7. A sheet material as defined in claim 6 wherein the average length of the fibers before curing is not more than 3.0 mm.

8. A sheet material as defined in claim 6 where the average diameter of the fibers before curing is from 1 mm. to 6.0 mm.

9. A sheet material as defined in claim 1, 2, 3, 4 or 5 wherein the fibers are present in said lacquer coating in the proportion of from 10% to 40% by weight of the cured lacquer coating.

10. A sheet material as defined in claim 9 wherein said fibers are present in said lacquer coating in the proportion of from 14% to 32% by weight of the cured lacquer coating.

11. A sheet material comprising a substrate and a coating on at least one surface of said sheet produced by applying to said substrate a layer of a lacquer having fibers dispersed therein and curing said lacquer and fibers on said substrate.

12. A sheet material as defined in claim 11 wherein said fibers are selected from the group consisting of acrylic fibers, polyester fibers, nylon fibers and cellulose fibers.

13. A sheet material as defined in claim 11 wherein said lacquer comprises a film forming binder selected from the group consisting of polyester resin, polyacrylic resin and polyurethane resin.

14. A sheet material as defined in claim 1 wherein said fibers are selected from the group consisting of acrylic fibers, polyester fibers, nylon fibers and cellulose fibers, and wherein said lacquer is selected from the group consisting of polyester resin, polyacrylic resin and polyurethane resin.

* * * * *

UNITED STATES PATENT AND TRADEMARK OFFICE
CERTIFICATE OF CORRECTION

PATENT NO. : 5,462,792
DATED : Oct. 31, 1995
INVENTOR(S) : Hendrikus De Jong

It is certified that error appears in the above-indentified patent and that said Letters Patent is hereby corrected as shown below:

Col. 5, line 45 (claim 6)   "A sheet material as defined in claim 2, 3 or 4" should be --A sheet material as defined in claim 2, 3, 4 or 5--.

Signed and Sealed this

Eleventh Day of March, 1997

Attest:

BRUCE LEHMAN

*Attesting Officer*   Commissioner of Patents and Trademarks